United States Patent
Oh et al.

(10) Patent No.: US 11,991,412 B2
(45) Date of Patent: *May 21, 2024

(54) STANDARD DYNAMIC RANGE (SDR) / HYBRID LOG-GAMMA (HLG) WITH HIGH DYNAMIC RANGE (HDR) 10+

(71) Applicant: SAMSUNG ELECTRONICS CO., LTD., Suwon-si (KR)

(72) Inventors: Seongnam Oh, Irvine, CA (US); Soojung Hyun, Tustin, CA (US); William Mandel, Moorpark, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,446

(22) Filed: Feb. 24, 2023

(65) Prior Publication Data

US 2023/0224536 A1 Jul. 13, 2023

Related U.S. Application Data

(63) Continuation of application No. 17/491,413, filed on Sep. 30, 2021, now Pat. No. 11,606,605.

(51) Int. Cl.
*H04N 21/4402* (2011.01)
*G06T 5/50* (2006.01)
(Continued)

(52) U.S. Cl.
CPC ....... *H04N 21/440218* (2013.01); *G06T 5/50* (2013.01); *G06T 5/92* (2024.01);
(Continued)

(58) Field of Classification Search
CPC ...... H04N 19/186; H04N 19/46; H04N 19/70; H04N 19/98; H04N 19/85; H04N 19/117;
(Continued)

(56) References Cited

U.S. PATENT DOCUMENTS 10,264,287 B2 4/2019 Wen et al.
10,291,874 B2 5/2019 Toma et al.
(Continued)

FOREIGN PATENT DOCUMENTS

KR 10-2021-0021630 A 3/2021

OTHER PUBLICATIONS

International Search Report and Written Opinion dated Jan. 10, 2023 for International Application PCT/KR2022/014562, from Korean Intellectual Property Office, pp. 1-9, Republic of Korea.

*Primary Examiner* — Jason Salce
(74) *Attorney, Agent, or Firm* — Sherman IP LLP; Kenneth L. Sherman; Steven Laut (57) ABSTRACT

A computer-implemented method includes performing analysis to determine information associated with a high dynamic range (HDR) media content item. A standard dynamic range (SDR) version of the HDR media content item is derived using HDR metadata. The derivation including encoding the HDR media content item to SDR content and normalizing data of the SDR content. The HDR metadata and the SDR version of the HDR media content item are transmitted with embedding of the HDR metadata within a protocol with the SDR version to a storage service. The HDR metadata and the SDR version are caused to be received at a display device. The SDR version is converted to HDR per incremental portion with a dynamic range bounded based on the HDR metadata of the protocol.

20 Claims, 6 Drawing Sheets

(51) Int. Cl.
*G06T 5/92* (2024.01)
*H04N 7/01* (2006.01)
*H04N 21/2743* (2011.01)
*H04N 21/435* (2011.01)
*H04N 21/84* (2011.01)

(52) U.S. Cl.
CPC ....... *H04N 7/0125* (2013.01); *H04N 21/2743* (2013.01); *H04N 21/435* (2013.01); *H04N 21/84* (2013.01); *G06T 2207/20208* (2013.01)

(58) Field of Classification Search
CPC ........ H04N 19/30; H04N 9/68; H04N 1/6058; H04N 19/172; G06T 2207/20208; G06T 5/009; G06T 5/007; G06T 5/40; G06T 2207/10024; G06T 2207/10016
See application file for complete search history.

(56) References Cited

U.S. PATENT DOCUMENTS

| | | |
|---|---|---|
| 10,574,936 B2 | 2/2020 | Wu et al. |
| 10,679,585 B2 | 6/2020 | Oh |
| 10,834,400 B1 | 11/2020 | Topiwala et al. |
| 11,277,627 B2 | 3/2022 | Song et al. |
| 11,606,605 B1 * | 3/2023 | Oh ..................... H04N 21/2743 |
| 2014/0050271 A1 | 2/2014 | Su et al. |
| 2017/0085889 A1 | 3/2017 | Baylon et al. |
| 2018/0007356 A1 | 1/2018 | Kadu et al. |
| 2018/0098094 A1 | 4/2018 | Wen et al. |
| 2018/0109743 A1 | 4/2018 | Oh et al. |
| 2018/0233075 A1 | 8/2018 | Boyd |
| 2018/0249182 A1 | 8/2018 | Andrivon et al. |
| 2019/0132617 A1 | 5/2019 | Liu et al. |
| 2019/0272643 A1 | 9/2019 | Gadgil et al. |
| 2019/0295454 A1 | 9/2019 | Urabe |
| 2020/0145570 A1 | 5/2020 | Umeyama |
| 2020/0154143 A1 | 5/2020 | Tsjukagoshi |
| 2020/0219298 A1 | 7/2020 | Urabe et al. |
| 2020/0252687 A1 | 8/2020 | Ryu et al. |
| 2020/0288132 A1 | 9/2020 | Baylon et al. |
| 2020/0351524 A1 | 11/2020 | Lee et al. |
| 2020/0394774 A1 | 12/2020 | Andrivon et al. |
| 2020/0413099 A1 | 12/2020 | Su et al. |
| 2021/0051344 A1 | 2/2021 | Talstra et al. |
| 2021/0092461 A1 | 3/2021 | Gadgil et al. |
| 2021/0235093 A1 | 7/2021 | Guo et al. |
| 2021/0274226 A1 | 9/2021 | Andrivon et al. |
| 2021/0377573 A1 | 12/2021 | Ferrara et al. |

* cited by examiner

STANDARD DYNAMIC RANGE (SDR) / HYBRID LOG-GAMMA (HLG) WITH HIGH DYNAMIC RANGE (HDR) 10+

CROSS-REFERENCE TO RELATED APPLICATIONS

This application is a continuation of U.S. Non-Provisional patent application Ser. No. 17/491,413, filed Sep. 30, 2021, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to transmission of standard dynamic range (SDR) content for display systems, and in particular, to conversion of the SDR content to high dynamic range (HDR) content based on a protocol.

BACKGROUND

Currently, personal camcorder and mobile devices allow consumers to capture video in HDR (10-bit) and upload on social media services and other cloud services. The service providers, however, are not ready yet to support this HDR/ultra-high definition (HDR/UHD) content. Therefore, these service providers transcode the video stream to SDR/hybrid log gamma (SDR/HLG) (8-bit) video and not only valuable content video characteristic information and the creative intention gets lost.

SUMMARY

One or more embodiments relate to conversion of standard dynamic range (SDR) content to high dynamic range (HDR) content based on a protocol. In some embodiments, a computer-implemented method includes performing analysis to determine information associated with an HDR media content item. An SDR version of the HDR media content item is derived using HDR metadata. The derivation including encoding the HDR media content item to SDR content and normalizing data of the SDR content. The HDR metadata and the SDR version of the HDR media content item are transmitted with embedding of the HDR metadata within a protocol with the SDR version to a storage service. The HDR metadata and the SDR version are caused to be received at a display device. The SDR version is converted to HDR per incremental portion with a dynamic range bounded based on the HDR metadata of the protocol.

In some embodiments, a non-transitory processor-readable medium that includes a program that when executed by a processor performs a conversion of SDR content to HDR content and includes performing, by the processor, analysis to determine information associated with an HDR media content item. The processor further derives an SDR version of the HDR media content item using HDR metadata. The derivation including encoding the HDR media content item to SDR content and normalizing data of the SDR content. The processor further transmits the HDR metadata and the SDR version of the HDR media content item with embedding of the HDR metadata within a protocol with the SDR version to a storage service. The processor additionally causes the HDR metadata and the SDR version to be received at a display device. The SDR version is converted to HDR per incremental portion with a dynamic range bounded based on the HDR metadata of the protocol.

In some embodiments, an apparatus comprises a memory storing instructions. At least one processor executes the instructions including a process configured to perform analysis to determine information associated with an HDR media content item. An SDR version of the HDR media content item is derived using HDR metadata. The derivation includes encoding the HDR media content item to SDR content and normalizing data of the SDR content. The HDR metadata and the SDR version of the HDR media content item are transmitted with embedding of the HDR metadata within a protocol with the SDR version to a storage service. The HDR metadata and the SDR version are caused to be received at a display device. The SDR version is converted to HDR per incremental portion with a dynamic range bounded based on the HDR metadata of the protocol.

These and other features, aspects and advantages of the one or more embodiments will become understood with reference to the following description, appended claims and accompanying figures.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Some embodiments provide conversion of standard definition range (SDR) content to high dynamic range (HDR) content based on a protocol. In one or more embodiments, a computer-implemented method includes accessing an HDR media content item. Statistical analysis is performed to determine statistical information associated with the HDR media content item at each incremental portion of the HDR media content item. Metadata for each incremental portion of the HDR media content item is generated. An SDR version of the content is derived using the HDR metadata. The metadata and an SDR version of the HDR media content item is transmitted to a storage service. The metadata and the SDR version are caused to be received at a display device. The SDR version is converted to HDR with a dynamic range bounded based on the metadata The term "image" referred to herein may include a two-dimensional image, three-dimensional image, video frame, a computer file representation, an image from a camera, a video frame, or a combination thereof. For example, the image may be a machine readable digital file, a physical photograph, a digital photograph, a motion picture frame, a video frame, an x-ray image, a scanned image, or a combination thereof. The image may be generated from pixels arranged in a rectangular array. The image may include an x-axis along the direction of the rows and a y-axis along the direction of the columns. The term "image" may indicate a still image or a moving picture of a video, i.e., the latter indicating the video itself. The term "image" may include a partial or the entire screen image displayable on a display besides a still image (e.g., a photograph) or a video. In addition, the term "image" may also originally include a displayable screen image itself such as a user interface or a webpage besides a still image (e.g., a photograph) or a video.

As mentioned above, service providers that transcode a video stream to standard dynamic range/hybrid log gamma (SDR/HLG) (8-bit) video and not only valuable content video characteristic information and the creative intention gets lost. In some embodiments, this lost information may be kept with very small metadata, which is HDR10+ metadata. The HDR10+ metadata may be used to recover the SDR/HLG content to HDR10+ content and deliver the rich and brighter videos with feasible devices.

Figure 1:
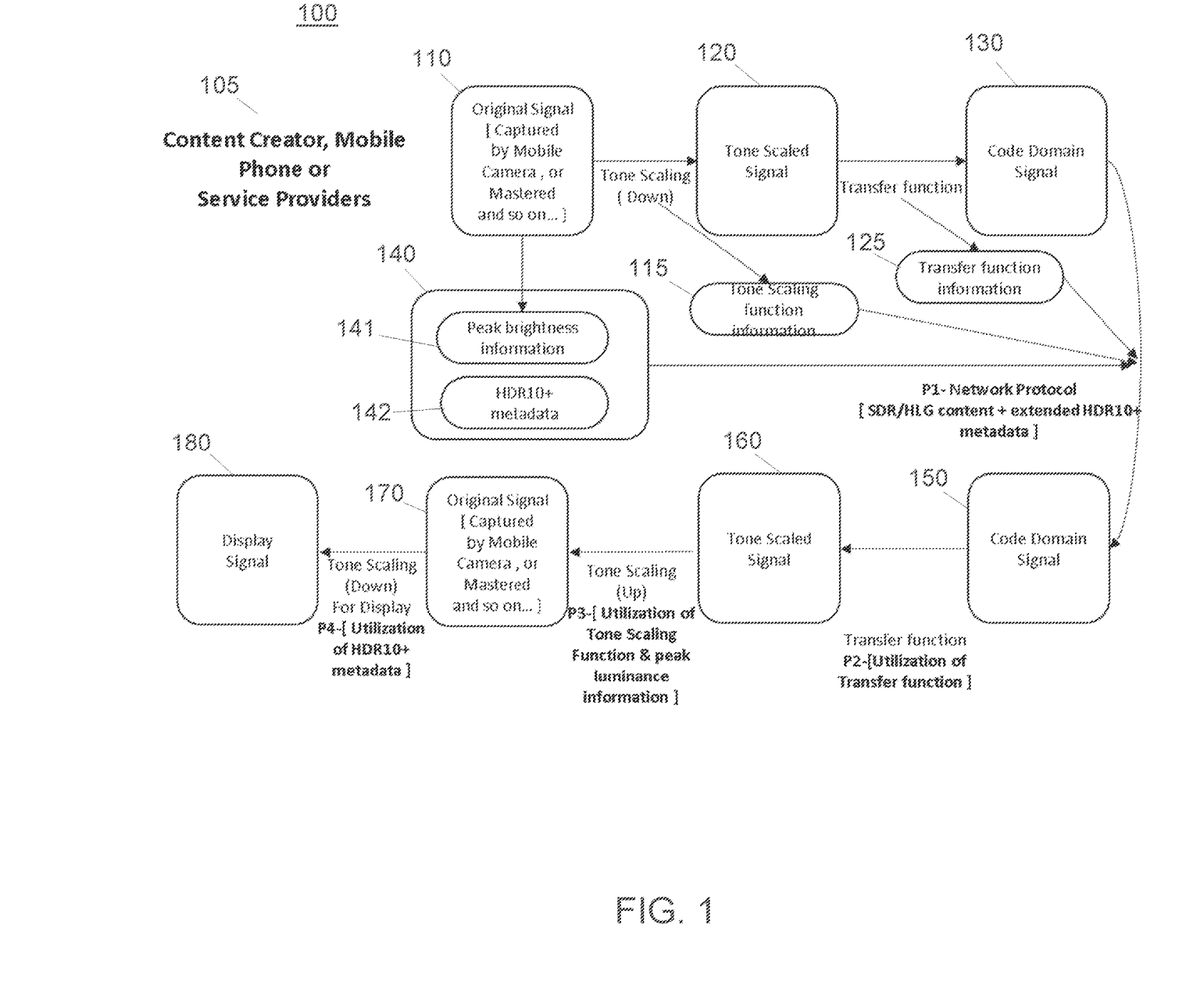
FIG. 1 shows a system architecture, according to some embodiments.

FIG. 1 shows a system architecture 100, according to some embodiments. In one embodiment, the content creator, mobile phone or service providers 105 provide or transmit an original signal or stream of HDR content (e.g., video, images, etc.) that is captured at block 110 by a mobile device (e.g., mobile camera, mobile phone, etc.) or mastered, etc. The original signal is then tone scaled (down) and provided to block 120 as a tone scaled signal, and where tone scaling function information 115 is provided for use at block 150 (code domain signal) after further processing. The tone scaled signal in block 120 has a transfer function applied to result with a code domain signal at block 130, where the transfer function information 125 is provided for use at block 150 (code domain signal) after further processing. In block 140, the peak brightness information 141 and HDR10+ metadata 142 is determined and provided to block 150 as the code domain signal that takes P1-network protocol (SDR/HLG content+ extended HDR10+ metadata) as input. The code domain signal in block 150 is processed using a transfer function as P2-(utilization of the transfer function). P2 is provided to block 160 where the signal is tone scaled resulting in P3-(utilization of tone scaling function and peak luminance information). P3 is processed in block 170 as the original signal (captured by the mobile device, mastered, etc.). The original signal from block 170 is processed with tone scaling (down) for a display as P4-(utilization of HDR10+ metadata) resulting in the displayed signal at block 180.

In some embodiments, an HDR video can be recovered or regenerated by use of metadata, HDR10+ metadata at the representation level. In one embodiment, HDR10+ metadata is delivered per frame for 8-bit SDR/HLG content. The HDR10+ metadata indicates how the 8-bit content can be recovered to 10-bit HDR content (P1). In order to retain the quality of original content characteristics as much as possible, building up a two pair operation (forward operation from service provider and inverse operation from the display end) is employed according to one or more embodiments. To preserve the quality of content through the protocol and system operation mechanism from content delivery to display, the system architecture 100 requires a protocol that indicates what kind of tone scaling operation has been used to generate SDR/HLG content so that a display device may properly recover the content with the information within the protocol. Also, carrying over the characters of real-world (scene referred) or original content's maximum brightness information to a display device helps recovering of the original brightness from display and tone scaling to display peak luminance.

In one or more embodiments, from the content creator, mobile phone or service providers 105 end, any kind of tone scaling function may be used to generate SDR/HLG content, but if it uses HDR10+ tone mapping to generate SDR/HLG content from original world referred image/video or HDR video, utilization of inverse HDR10+ tone mapping operation from the display end will provide back the best quality to maintain the original content characteristics. If the tone scaling function uses a BT.2390 standard tone scaling function, inversed BT.2390 will provide the best quality after recovering the SDR/HLG content to HDR content from the display end. For example, if the tone-scaling down processing (from block 110 to block 120) is performed with an HDR10+ algorithm, utilization of the inverse operation (P3 tone-scaling up) with the same algorithm provides the best quality back; another example for the tone-scaling down may be performed with Gamma 2.2, 2.5. or 2.6 functions, and the display recovers based on the carry-over tone scaling function information 115.

In some embodiments, information about the transfer function provides for proper recovery of a signal from a code domain to a linear domain. Generating and embedding HDR10+ metadata within the protocol with SDR/HLG content provides for a richer result after the SDR/HLG content conversion to HDR from the display end, and applying the HDR10+ metadata to result with the maximum benefits of dynamic HDR technology (e.g., frame or scene based dynamic HDR instead of static HDR).

In one or more embodiments, the tone scaling function information 115 and the transfer function information 125 are used to generate HDR10+ metadata with SDR/HLG content and to indicate the signal of the HDR10+ metadata with SDR content. From the content creator, mobile phone or service providers 105 end, usually the system has only one operation path: either an HDR workflow or an SDR/HLG workflow. In order to generate the HDR10+ metadata with SDR/HLG content, it conceptually hybrids the workflows, but actual implementation is possible with working in a linear domain before branching to SDR, HLG or an HDR workflow. The diverseness of SDR, HLG and HDR protocol generation and delivery mechanisms create new issues, and embodiments process a way to utilize legacy SDR/HLG and HLG delivery protocols with HDR information.

In some embodiments, the generation of HDR10+ metadata with a scene referred signal and indicated signal of the HDR10+ metadata with SDR content is processed by the system architecture 100 as follows. From the original captured signal 110, the signal is a real-world (scene referred) signal, and it may be represented as absolute values for the brightness and colors as RGB. The real-world (scene referred) signal should be converted as a display referred signal in order to render the signal on a display device and for its actual operation of the tone scaling down operation with a chosen algorithm. After the tone (down) scaling, the system architecture 100 retouches the signal to deliver the signal through network protocols (including codec technology). In one example embodiment, the most popular algorithm solution (legacy) is gamma 2.2 because an example display technology used it, and the display can directly render the signal; but currently, new HDR display technology can handle other transfer functions such as PQ (SMPTE. 2084), and with new transfer functions in the market. The diversity of SDR, HLG and HDR protocol generation and delivery mechanisms creates a new issue point, and then a new technique with utilization of legacy SDR/HLG and HLG delivery protocols with HDR information is provided, according to one or more embodiments. This HDR video may be recovered or regenerated by use of small sized metadata, HDR10+ metadata at the representation level.

In one or more embodiments, for P2, P3 and P4, the signal (per frame) HDR10+ metadata to the end devices (e.g., a TV display, a mobile device, etc.) may help convert 8-bit SDR/HLG (including 10-bit HLG) content to 10-bit HDR content using HDR10+ metadata. Once a display device receives the SDR/HLG video and the HDR10+ metadata, the display device can recover the SDR/HLG content to HDR content by referring the HDR10+ metadata. The HDR10+ metadata may be extended to have more information such as: the real-world (scene referred) data characteristics, a tone scaling function, and a transfer function mechanism. This HDR video may be recovered or regenerated by use of a small sized metadata, HDR10+ metadata, at the representation level. In some embodiments, if the display device does not have a capability to handle HDR, the received HDR10+ metadata can be ignored.

In some embodiments, the system architecture 100 encodes content to SDR/HLG content, normalizes data in the range of 0 to 1 to represent the SDR/HLG content from 0 to 1, and matches a range of 0-1023 if the content uses 10-bit bit-depth; but normal SDR/HLG content uses 8-bit bit-depth and the maximum value of the content is 255. Because the original SDR/HLG content is normalized with 0.0~1.0, it already lost the information about the absolute value of real-world (scene referred) brightness (luminance) information, and it is hard to recover the original look and feel from real-world. The signaling protocol helps the recovery mechanism to build from the SDR/HLG content to the right HDR with dynamic HDR per frame. In one or more embodiments, the HDR10+ protocol may have to be extended to deliver more information such as: the real-world (scene referred) data characteristics, the tone scaling function, the transfer function mechanism, and the HDR10+ metadata. In one or more embodiments, further information that may assist is a maximum peak luminance value of original content, such that when a display device recovers SDR/HLG to HDR, the display device will know how much the maximum value is for each frame. A tone scaling function may be employed to generate the real-world (scene referred) signal to a desired linear signal to make the SDR content. Using transfer function information, a display device can build a correct inverse operation. The transfer function may be any type if it can generate reasonable SDR/HLG content and if it can be mathematically investable. In some embodiments, the common functions that may be used for tone scaling or for a transfer function are Gamma (2.2, 2.4 and 2.6), PQ, BT.2390, BT.2390-8 with minimums, Reinhard, Möbius, Hable, Linear and HDR10+ tone scaling.

A supplemental enhancement information (SEI) message is defined by the Moving Picture Experts Group (MPEG). In one or more embodiments, HDR10+ metadata is delivered by an SEI message that signals the HDR10+ metadata for HDR 10-bit content. We believe this signaling will be also delivered by SEI message.

Consumer Technology Association (CTA) describes how digital audio/video signals can be sent from one device to another device. In some embodiments, HDR10+ metadata SEI syntax and semantics are defined in the CTA 861-specification. HDR10+ metadata is defined in the SMPTE ST. 2094-40 and HDR10+ Technical specifications. HDR 10-bit perceptual quantization (PQ) is defined in the SMPTE ST 2084 specification, which is the baseline of HDR technology and the HDR10+ technology is running on top of the baseline to adjust contrast per scene or frame.

Figure 2:
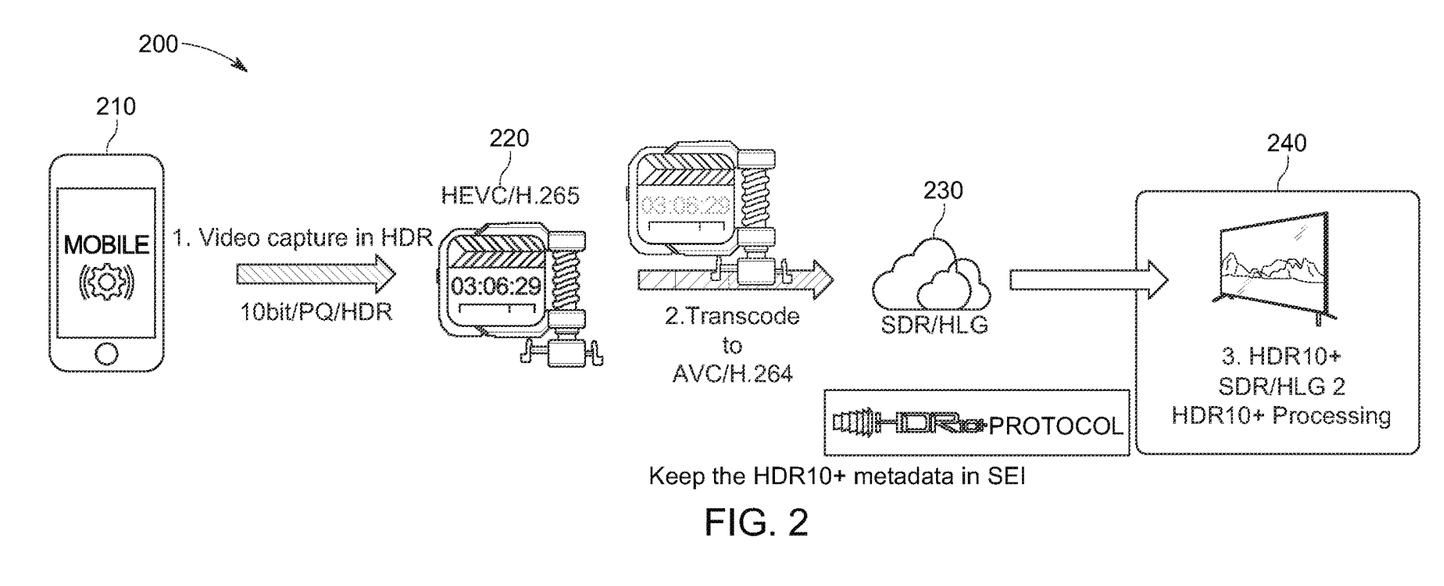
FIG. 2 shows an example use case showing HDR10+ signaling for standard dynamic range (SDR) content used for displays for high dynamic range (HDR) recovery, according to some embodiments.

FIG. 2 shows an example use case 200 showing HDR10+ signaling for SDR content used for displays for HDR recovery, according to some embodiments. This example shows the HDR10+ signaling for 8-bit SDR content that may be used for displays that support 10-bit, and converts the HDR10+ metadata for 10-bit HDR recovery. In some embodiments, the mobile device 210 captures 10-bit HDR content (at 1) with a camcorder at 220. Before uploading the video to a cloud/app service 230, the camcorder may transcode the video (at 2) to 8-bit SDR, which may lose its original HDR video information. When the transcoding happens (at 2), the HDR10+ metadata is kept in SEI messaging and uploaded in the cloud/app service 230. When the end display device 240 streams the 8-bit SDR content from the cloud/app service 230, it understands the HDR10+ signal using the HDR10+ metadata, and the 8-bit SDR content is recovered to 10-bit HDR content for a better picture quality.

Figure 3:
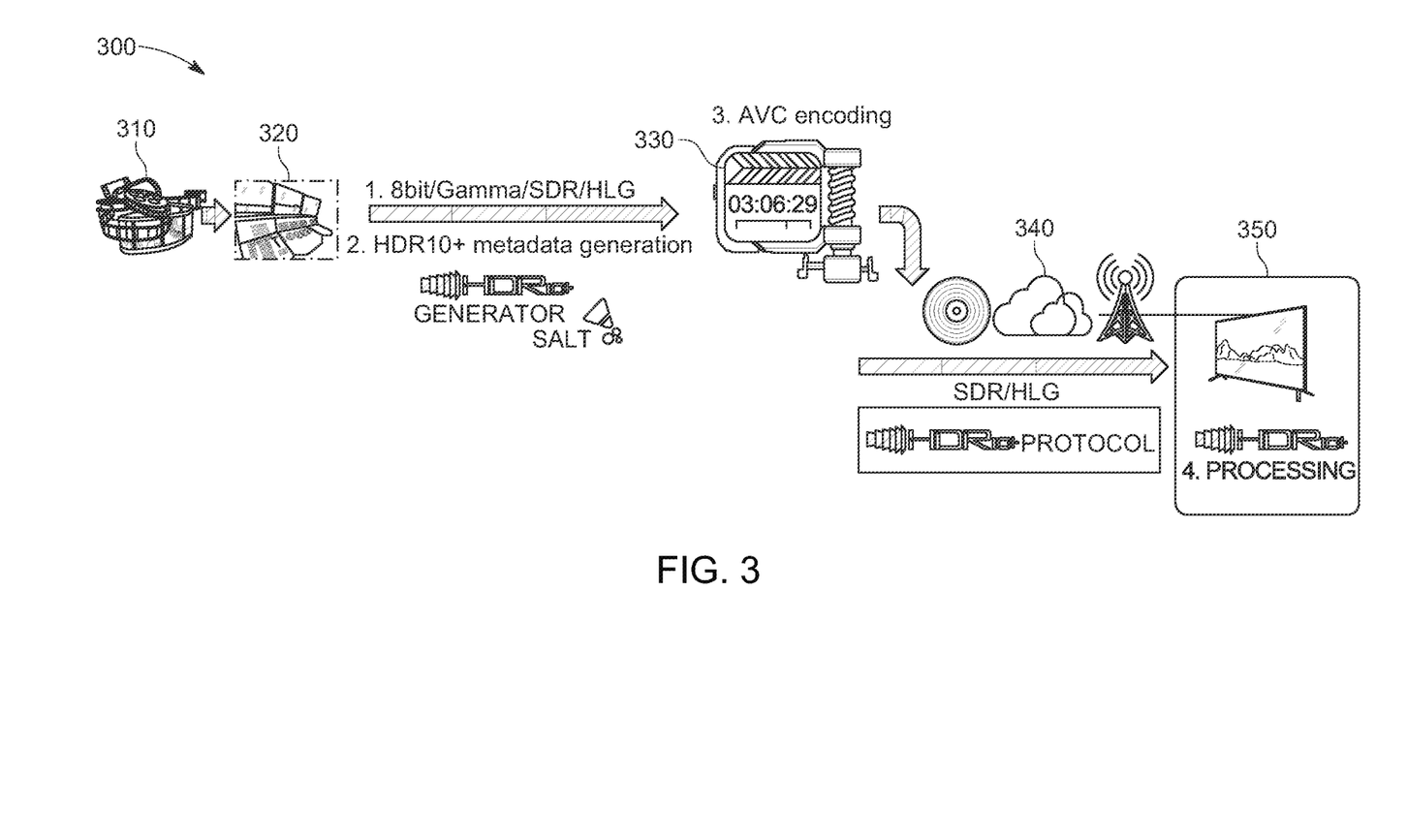
FIG. 3 shows another example use case showing SDR content used to recover HDR content, according to some embodiments.

FIG. 3 shows another example use case 300 showing SDR content used to recover HDR content, according to some embodiments. The original content 310 is provided from a network system 320 (e.g., TV/satellite/cable broadcast). The content 310 is originally generated in 8-bit SDR from the computing device 320 (at 1). Using a tool such as SALT (e.g., hashing tool, encoding tool, etc.), HDR10+ with the 8-bit SDR content is generated (at 2). Advanced video coding (AVC) encoding 330 of the 8-bit SDR content with HDR10+ metadata is performed (e.g., from a stored disc, uploaded to the cloud and streamed 340). The signal is received by the end device 350 that recovers the 8-bit SDR to 10-bit HDR. That is, the HDR10+ protocol to the signal SDR/HLG 8-bit video+HDR10+ metadata in SEI so that a device understands the signal and recovers the SDR/HLG content to HDR10+ content. Conventional systems do not retain 8-bit SDR/HLG content with HDR10+ metadata for each frame, nor do these conventional systems convert 8-bit SDR/HLG content to 10-bit HDR content based on the HDR10+ metadata for each frame. Some embodiments expand HDR protocol by carrying over absolute value (maximum value) of original SDR/HLG content.

Figure 4A:
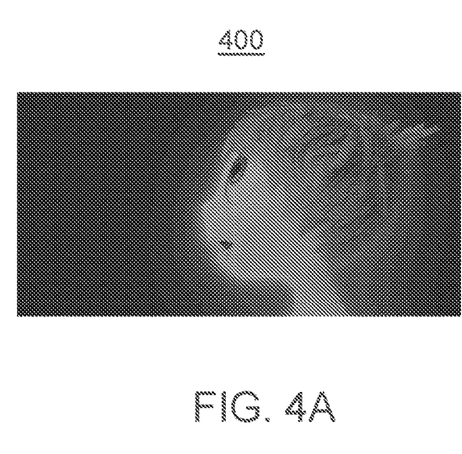
FIG. 4A shows an example SDR content.
Figure 4B:
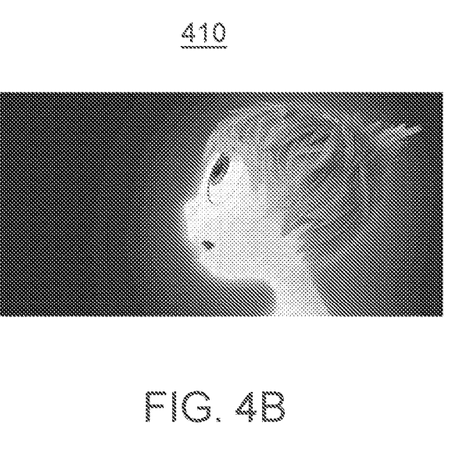
FIG. 4B shows an example HDR10+ content obtained from the example in FIG. 4A, according to some embodiments.

FIG. 4A shows an example SDR content 400. FIG. 4B shows an example HDR10+ content 410 obtained from the example in FIG. 4A using processing from system architecture 100 (FIG. 1), example use case 200 (FIG. 2), or example use case 300 (FIG. 3), according to some embodiments. Currently there are hundreds of millions UHD TVs that can benefit from using the technology of one or more embodiments where 8 bit SDR content is recovered in 10-bit HDR content, which provide additional reasons to consumers to purchase a UHD TV device.

Figure 5A:
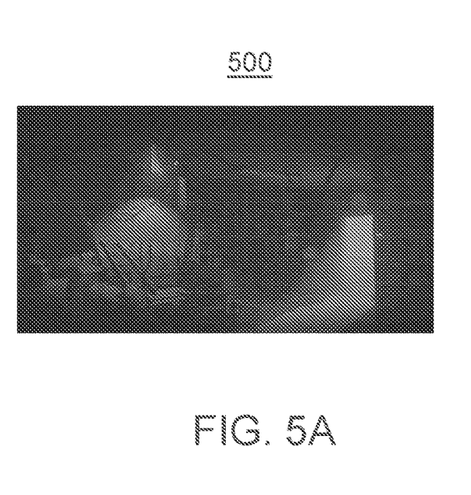
FIG. 5A shows another example SDR content.
Figure 5B:
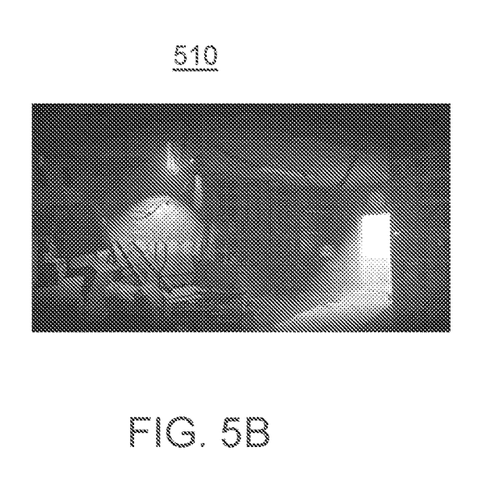
FIG. 5B shows another example HDR10+ content obtained from the example in FIG. 5A, according to some embodiments.

FIG. 5A shows another example SDR content 500. FIG. 5B shows another example HDR10+ content 510 obtained from the example SDR content 500 in FIG. 5A, according to some embodiments.

Figure 6:
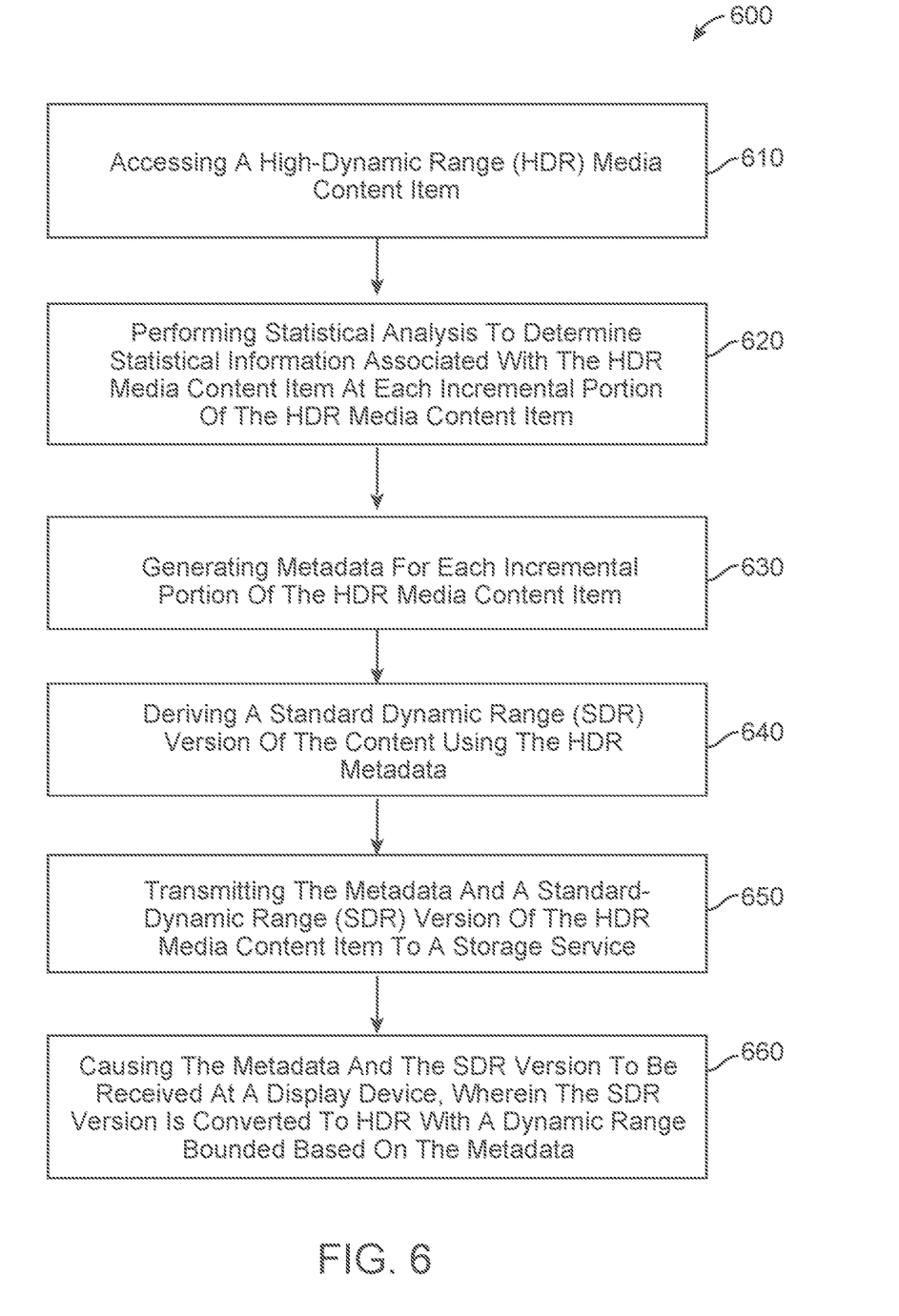
FIG. 6 shows an example process for recovering HDR10+ content from SDR content, according to some embodiments.

FIG. 6 shows a block diagram for a process 600 for conversion of the SDR content to HDR content based on a protocol, according to some embodiments. In block 610, an HDR media content item is accessed (e.g., from a recording, a disc, a file, etc.). In block 620, process 600 provides that statistical analysis is performed to determine statistical information associated with the HDR media content item at each incremental portion of the HDR media content item. In block 630, process 600 provides that metadata is generated for each incremental portion (e.g., frame or scene) of the HDR media content item. In block 640, process 600 provides for deriving an SDR version of the content using the HDR metadata. In block 650, process 600 provides for transmitting the metadata and an SDR version of the HDR media content item to a storage service. In block 660, process 600 provides for causing the metadata and the SDR version to be received at a display device, and the SDR version is converted to HDR with a dynamic range bounded based on the metadata.

In one or more embodiments, process 600 may provide that the metadata is generated to include the calculated statistical information associated with the HDR media content item at each frame or scene. Additionally, process 600 may include the feature that the storage service is a cloud storage service.

In some embodiments, process 600 may include the feature that converting the SDR version to HDR includes converting 8-bit SDR content to 10-bit HDR content based on a protocol.

In one or more embodiments, process 600 may include the feature that converting the SDR version to HDR includes converting an HLG version to HDR.

In some embodiments, process 600 may include the feature that the protocol includes an extension of HDR10+ metadata with a transfer function and maximum peak luminance per each frame.

Figure 7:
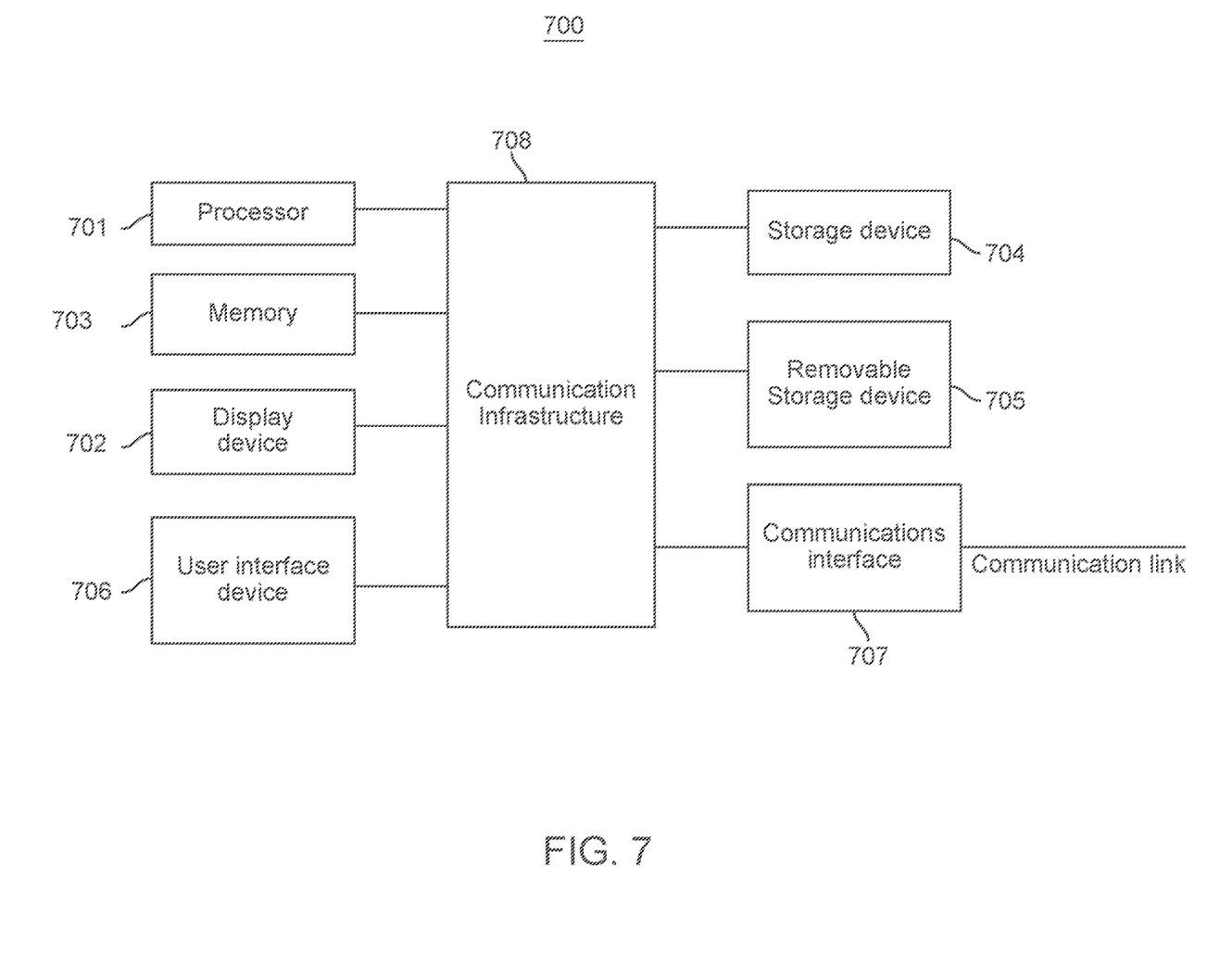
FIG. 7 is an exemplary high-level block diagram showing an information processing system comprising a computer system useful for implementing disclosed embodiments.

FIG. 7 is a high-level block diagram showing an information processing system comprising a computer system 700 useful for implementing the disclosed embodiments. Computer system 700 may be incorporated in a display device, such as display device 240 (FIG. 2), end device 350 (FIG. 3), etc. The computer system 700 includes one or more processors 701, and can further include an electronic display device 702 (for displaying video, graphics, text, and other data), a main memory 703 (e.g., random access memory (RAM)), storage device 704 (e.g., hard disk drive), removable storage device 705 (e.g., removable storage drive, removable memory module, a magnetic tape drive, optical disk drive, computer readable medium having stored therein computer software and/or data), user interface device 706 (e.g., keyboard, touch screen, keypad, pointing device), and a communication interface 707 (e.g., modem, a network interface (such as an Ethernet card), a communications port, or a PCMCIA slot and card). The communication interface 707 allows software and data to be transferred between the computer system and external devices. The system 700 further includes a communications infrastructure 708 (e.g., a communications bus, cross-over bar, or network) to which the aforementioned devices/modules 701 through 707 are connected.

Information transferred via communications interface 707 may be in the form of signals such as electronic, electromagnetic, optical, or other signals capable of being received by communications interface 707, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

In some embodiments, processing instructions for process 600 (FIG. 6) may be stored as program instructions on the memory 703, storage device 704 and the removable storage device 705 for execution by the processor 701.

Some embodiments may be applied to the following implementations (but are not limited to): all TV products including high-end UHD and HDR TVs, mobile devices capable of rendering image/video content, software applications related to image/video content rendering, etc.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method comprising:
performing analysis to determine information associated with a high dynamic range (HDR) media content item;
deriving a standard dynamic range (SDR) version of the HDR media content item using HDR metadata, the deriving including encoding the HDR media content item to SDR content and normalizing data of the SDR content;
transmitting the HDR metadata and the SDR version of the HDR media content item with embedding of the HDR metadata within a protocol with the SDR version to a storage service; and
causing the HDR metadata and the SDR version to be received at a display device, wherein the SDR version is converted to HDR per incremental portion with a dynamic range bounded based on the HDR metadata of the protocol.

2. The computer-implemented method of claim 1, wherein each incremental portion comprises a frame or a scene of the HDR media content item, the analysis performed comprises a statistical analysis, and the determined information comprises statistical information.

3. The computer-implemented method of claim 2, wherein the statistical information is associated with the HDR media content item at each incremental portion of the HDR media content item.

4. The computer-implemented method of claim 1, further comprising:
generating the HDR metadata for each incremental portion of the HDR media content item;
wherein the HDR metadata indicates a type of tone scaling operation used to generate the SDR version of the HDR media content item, the HDR media content item comprises a recording, and the deriving further includes matching the normalized data to a particular range for 10-bit depth content.

5. The computer-implemented method of claim 1, wherein converting the SDR version to HDR comprises converting 8-bit SDR content to 10-bit HDR content per frame based on the protocol.

6. The computer-implemented method of claim 5, wherein converting the SDR version to HDR comprises converting a Hybrid Log-Gamma (HLG) version to HDR, the HDR metadata comprises HDR10+ metadata, and the HDR10+ metadata is delivered via a supplemental enhancement information (SEI) message.

7. The computer-implemented method of claim 5, wherein the HDR metadata comprises HDR10+ metadata, the HDR10+ metadata is extended with scene referred data characteristics, a tone scaling function and a transfer function, and the scene referred data characteristics include maximum peak luminance value of original content per each frame.

8. A non-transitory processor-readable medium that includes a program that when executed by a processor performs a conversion of the standard dynamic range (SDR) content to high dynamic range (HDR) content, comprising:
performing, by the processor, analysis to determine information associated with an HDR media content item;
deriving, by the processor, an SDR version of the HDR media content item using HDR metadata, the deriving including encoding the HDR media content item to SDR content and normalizing data of the SDR content;
transmitting, by the processor, the HDR metadata and the SDR version of the HDR media content item with embedding of the HDR metadata within a protocol with the SDR version to a storage service; and
causing, by the processor, the HDR metadata and the SDR version to be received at a display device, wherein the SDR version is converted to HDR per incremental portion with a dynamic range bounded based on the HDR metadata of the protocol.

9. The non-transitory processor-readable medium of claim 8, wherein each incremental portion comprises a frame or a scene of the HDR media content item, the analysis performed comprises a statistical analysis, and the determined information comprises statistical information.

10. The non-transitory processor-readable medium of claim 9, wherein the statistical information is associated with the HDR media content item at each incremental portion of the HDR media content item.

11. The non-transitory processor-readable medium of claim 8, further comprising:
generating, by the processor, the HDR metadata for each incremental portion of the HDR media content item;
wherein the HDR metadata indicates a type of tone scaling operation used to generate the SDR version of the HDR media content item, the HDR media content item comprises a recording, and the deriving further includes matching the normalized data to a particular range for 10-bit depth content.

12. The non-transitory processor-readable medium of claim 8, wherein converting the SDR version to HDR comprises converting 8-bit SDR content to 10-bit HDR content per frame based on the protocol.

13. The non-transitory processor-readable medium of claim 12, wherein converting the SDR version to HDR comprises converting a Hybrid Log-Gamma (HLG) version to HDR, the HDR metadata comprises HDR10+ metadata, and the HDR10+ metadata is delivered via a supplemental enhancement information (SEI) message.

14. The non-transitory processor-readable medium of claim 12, wherein the HDR metadata comprises HDR10+ metadata, the HDR10+ metadata is extended with scene referred data characteristics, a tone scaling function and a transfer function, and the scene referred data characteristics include maximum peak luminance value of original content per each frame.

15. An apparatus comprising:
a memory storing instructions; and
at least one processor executes the instructions including a process configured to:
perform analysis to determine information associated with a high dynamic range (HDR) media content item;
derive a standard dynamic range (SDR) version of the HDR media content item using HDR metadata, the deriving including encoding the HDR media content item to SDR content and normalizing data of the SDR content;
transmit the HDR metadata and the SDR version of the HDR media content item with embedding of the HDR metadata within a protocol with the SDR version to a storage service; and
cause the HDR metadata and the SDR version to be received at a display device, wherein the SDR version is converted to HDR per incremental portion with a dynamic range bounded based on the HDR metadata of the protocol.

16. The apparatus of claim 15, wherein each incremental portion comprises a frame or a scene of the HDR media content item, the analysis performed comprises a statistical analysis, the determined information comprises statistical information, and the statistical information is associated with the HDR media content item at each incremental portion of the HDR media content item.

17. The apparatus of claim 15, wherein the processor is further configured to:
generate the HDR metadata for each incremental portion of the HDR media content item;
wherein the HDR metadata indicates a type of tone scaling operation used to generate the SDR version of the HDR media content item, the HDR media content item comprises a recording, and the deriving further includes matching the normalized data to a particular range for 10-bit depth content.

18. The apparatus of claim 15, wherein converting the SDR version to HDR comprises converting 8-bit SDR content to 10-bit HDR content per frame based on the protocol.

19. The apparatus of claim 18, wherein converting the SDR version to HDR comprises converting a Hybrid Log-Gamma (HLG) version to HDR, the HDR metadata comprises HDR10+ metadata, and the HDR10+ metadata is delivered via a supplemental enhancement information (SEI) message.

20. The apparatus of claim 18, wherein the HDR metadata comprises HDR10+ metadata, the HDR10+ metadata is extended with scene referred data characteristics, a tone scaling function and a transfer function, and the scene referred data characteristics include maximum peak luminance value of original content per each frame.

* * * * *